US008878685B2

(12) United States Patent
Okuda et al.

(10) Patent No.: US 8,878,685 B2
(45) Date of Patent: Nov. 4, 2014

(54) FIELD DEVICE

(75) Inventors: Kouji Okuda, Tokyo (JP); Hiroaki Nagoya, Tokyo (JP); Kouichirou Murata, Tokyo (JP)

(73) Assignee: Azbil Corporation, Tokyo (JP)

( * ) Notice: Subject to any disclaimer, the term of this patent is extended or adjusted under 35 U.S.C. 154(b) by 237 days.

(21) Appl. No.: 13/419,582

(22) Filed: Mar. 14, 2012

(65) Prior Publication Data

US 2012/0249231 A1 Oct. 4, 2012

(30) Foreign Application Priority Data

Mar. 30, 2011 (JP) ................. 2011-074844

(51) Int. Cl.
*G08B 21/00* (2006.01)
*H03K 5/12* (2006.01)
*F16K 37/00* (2006.01)
*F16K 31/12* (2006.01)
*F15B 21/08* (2006.01)

(52) U.S. Cl.
CPC ............. *F16K 37/0041* (2013.01); *F16K 31/12* (2013.01); *F15B 21/08* (2013.01)
USPC ........... 340/635; 340/626; 340/915; 340/625; 327/170

(58) Field of Classification Search
USPC .......................................... 327/594; 340/635
See application file for complete search history.

(56) References Cited

U.S. PATENT DOCUMENTS 8,269,539 B2 * 9/2012 Juang et al. .................. 327/170

FOREIGN PATENT DOCUMENTS

JP 1-141202 A 6/1989
JP 6-48827 B2 6/1994

* cited by examiner

*Primary Examiner* — Steven Lim
*Assistant Examiner* — Muhammad Adnan
(74) *Attorney, Agent, or Firm* — Troutman Sanders LLP

(57) ABSTRACT

To provide reliable notification of a fault state when a power supply to a calculation processing portion is in the OFF state when a power supply to a communication processing portion is in the ON state. An isolating circuit, an inverting circuit inverting a signal branch-outputted through an output line of the isolating circuit, and a selecting circuit that uses the signal outputted from the output line of the isolating circuit as a first input and the inverted signal from the inverting circuit as a second input, to select either the first input or the second input, depending on a selection setting status thereof, to output the selected signal to the communication processing portion are provided. A +5 V voltage is applied through a resistor to the output line of the isolating circuit. This +5 V voltage is produced through the power supply supplied from the second double-wire transmission path.

1 Claim, 8 Drawing Sheets

Background Art

Background Art

FIELD DEVICE

CROSS REFERENCE TO RELATED APPLICATIONS

The present application claims priority under 35 U.S.C. §119 to Japanese Patent Application No. 2011-074844, filed Mar. 30, 2011, which is incorporated herein by reference.

FIELD OF TECHNOLOGY

The present invention relates to a field device, such as a positioner, that operates by receiving a supply of power sent through a transmission path.

BACKGROUND

Conventionally positioners, which are field devices that control the degrees of opening of regulator valves, are designed so as to operate with an electric current between 4 and 20 mA sent through a pair of electric wires from a higher-level system. For example, if a current of 4 mA is sent from the higher-level system, the valve opening of the regulator valve is set to 0%, and if a current of 20 mA is sent, then the valve opening of the regulator valve is set to 100%.

In recent years there have been proposals for positioners that have, in addition to their actual functions of controlling the degree of opening of the regulator valves, also opening degree transmitting functions, regulator valve fault diagnostics, and functions for sending, to the higher-level system, the results of fault self-diagnostics, and the like (See, for example, Japanese Unexamined Patent Application Publication H1-141202).

FIG. 6 is a shows a structural diagram of the critical components in a positioner that has a conventional communication function. In this figure, 1 is a positioner, 2 is a higher-level system, and 3 is a regulator valve. The positioner 1 is connected by two double-wire transmission paths to the higher-level system, and is provided with an input signal detecting portion 12, a valve lift detecting portion 13, a calculation processing portion (CPU) 14, an electro-pneumatic converting portion 15, an A/D converting portion 16, and a communication processing portion (electric current outputting circuit) 17.

The first double-wire communication path (first communication path) is a double-wire communication path 5 and 6 that is connected to a controller 4 of the higher-level system 2, where an electric current signal of between 4 and 20 mA, depending on the opening setting for the regulator valve 3, is inputted into the input signal detecting portion 12 of the positioner 1 from the controller 4 through this double-wire transmission path 5 and 6.

The input signal detecting portion 12 not only produces the operating power supply for the internal circuitry in the positioner 1 from the electric current signal of between 4 and 20 mA that is sent through the double-wire transmission path 5 and 6, but also sends a voltage signal, depending on the value of the electric current signal, to the A/D converting portion 16. The A/D converting portion 16 converts the voltage signal, from the input signal detecting portion 12, into a digital signal, and sends it to the calculation processing portion 14 as a signal indicating the opening setting for the regulator valve 3.

Note that the operating power supply produced by the input signal detecting portion 12 is provided to the internal circuitry, except for in the communication processing portion 17 of the positioner 1, through a switch SW1. In the present example, it is sent to the valve lift detecting portion 13, the calculation processing portion 14, the electro-pneumatic converting portion 15, and the A/D converting portion 16, as the internal circuitry that excludes the communication processing portion 17.

On the other hand, the valve lift detecting portion 13 detects the actual degree of opening of the regulator valve 3, and sends, to the A/D converting portion 16, a voltage signal in accordance with the actual degree of opening. The A/D converting portion 16 converts into a digital signal the voltage signal from the valve lift detecting portion 13, and sends it to the calculation processing portion 14 as a signal that indicates the actual degree of opening of the regulator valve 3.

The calculation processing portion 14, based on the signal indicating the opening setting of the regulator valve 3, and the signal indicating the actual degree of opening, sent through the A/D converting portion 16, generates a PWM signal in accordance with the deviation between the actual degree of opening and the opening setting for the regulator valve 3, and outputs it to the electro-pneumatic converting portion 15. The electro-pneumatic converting portion 15 converts the PWM signal, from the calculation processing portion 14, into a pneumatic pressure signal, and provides this converted pneumatic pressure signal to the driving portion of the regulator valve 3. As a result, the degree of valve opening (the valve lift position) of the regulator valve 3 is adjusted so that the actual degree of opening of the regulator valve 3 will match the opening setting.

Moreover, the calculation processing portion 14 has, in addition to the function for controlling the degree of opening of the regulator valve 3 in this way, also functions for calculating the actual degree of opening of the regulator valve 3, and functions for performing fault diagnostics on the regulator valve 3 and fault diagnostics on the positioner 1 itself.

The second double-wire transmission path (second transmission path) is a double-wire transmission path 7 and 8 that is connected to an external power supply 9 through a resistor 10, where the calculation processing portion 14 is connected through the double-wire transmission path 7 and 8 and the communication processing portion 17. The communication processing portion 17 operates based on the power supply that is provided, sent through the double-wire transmission path 7 and 8. This enables communication between the communicating device 11 and the positioner 1, which are connected to the double-wire transmission path 7 and 8, that is, enables transmission and reception of signals between the communication processing portion 17 and the communicating device 11. In an example of this, the actual degree of opening of the regulator valve 3, calculated by the calculation processing portion 14, the result of fault diagnostics for the regulator valve 3, or the result of self-diagnostics for the positioner 1 itself are sent from the communication processing portion 17 to the communicating device 11 on the outside.

As illustrated in FIG. 7, in a positioner 1 having this type of communication function, isolating circuits 18 are provided between the calculation processing portion 14 and the communication processing portion 17 to ensure electrical isolation of the inputs and outputs of the calculation processing portion 14 and the communication processing portion 17, so that no noise will be produced that would affect the processing operations in the calculation processing portion 14 or the communicating device 11.

FIG. 8 illustrates one example of an isolating circuit 19 that is provided in the transmission path from the calculation processing portion 14 to the communication processing portion 17. This isolating circuit 19 is illustrated as a pulse train signal transmitting device in Japanese Publication of Examined Application H6-48827 ("JP '827"). Note that an isolating circuit 20 is provided similarly in the transmission path from the communication processing portion 17 to the calculation processing portion 14.

In FIG. 8, 191 is an exclusive OR circuit, 192 is a photocoupler, 193 is a flip-flop, R1 through R5 are resistances, D1 is a diode, C1 and C2 are capacitors, T1 is an input terminal for a signal a from the calculation processing portion 14, and T2 is an output terminal for a signal e to the communication processing portion 17.

FIG. 9 is a timing chart illustrating the operation of the isolating circuit 19. FIG. 9 (a) is a signal a from the calculation processing portion 14 (one input signal into the exclusive OR circuit 191), (b) is an input signal b into the other input of the exclusive OR circuit 191, (c) is an output signal c of the exclusive OR circuit 191 (the input signal into the reset terminal of the flip-flop 193), (d) is an integrating signal d (the input signal into the set terminal of the flip-flop 193), and (e) is a signal e to the communication processing portion 17 (the Q output of the flip-flop 193).

When a pulse train signal is sent as the signal a from the calculation processing portion 14, the isolating circuit 19 produces a wide edge signal c as the output signal c of the exclusive OR circuit 191 on the rising edges of the pulse train signal, and produces a narrow edge signal c on the falling edges of the pulse train signal. Given this, the edge signal c that is produced is reproduced as a transmission signal c by the photocoupler 192, and this transmission signal c is inputted into the reset terminal of the flip-flop 193 while, at the same time, it is inputted into the set terminal of the flip-flop 193 as the integrating signal d that is inputted into the integrating circuit that is structured by the resistance R5 and the capacitor C2. As a result, the flip-flop 193 is repetitively set and reset, producing a signal e that reproduces the input signal a as the Q output of the flip-flop 193, where this signal e, which reproduces the input signal a, is sent to the communication processing portion 17.

The calculating processing portion 14, when sending the actual degree of opening of the regulator valve 3 to the communicating device 11, uses a pulse train signal having a duty ratio in accordance with the actual degree of opening as the signal a to the isolating circuit 19. The communication processing portion 17 receives the pulse train signal from the calculation processing portion 14 and adjusts the electric current that is outputted to the double-wire transmission path 7 and 8 to an electric current in the range of between 4 and 20 mA. Moreover, the calculation processing portion 14 has a function for performing fault diagnostics on the regulator valve 3 and a function for performing fault diagnostics on the positioner 1 itself, and when a fault is identified, a signal of a level that is different from the normal electric current range of between 4 and 20 mA is outputted to the double-wire transmission path 7 and 8 as a burnout signal (a warning signal).

This burnout signal has a burnout H signal of a level that is higher than the upper limit value of the normal electric current range, and a burnout L signal of a level that is lower than the lower limit value of the normal electric current range, and one of these burnout signals is set in advance as an output signal for when a fault is identified. For example, if the communicating device 11 is a device that recognizes a signal of a level that is higher than the upper limit value of the normal electric current range as being a fault, then the calculation processing portion 14 is set up to output the burnout H signal as the warning signal. In this case, the Q output of the flip-flop 193 in the isolating circuit 19 is caused to maintain a "H" level (a voltage level indicating the burnout H signal) through a command from the calculation processing portion 14. If the communicating device 11 is a device that recognizes a signal of a level that is lower than the lower limit value of the normal electric current range as being a fault, then the calculation processing portion 14 is set up to output the burnout L signal as the warning signal. In this case, the Q output of the flip-flop 193 in the isolating circuit 19 is caused to maintain a "L" level (a voltage level indicating the burnout L signal) through a command from the calculation processing portion 14.

In the positioner 1 illustrated in FIG. 7, the operating power supply is obtained from the double-wire transmission path that is different from that of the calculation processing portion 14 and the communication processing portion 17, making it possible to produce independent power supply ON/OFF states. For example, if the operator forgets to turn ON the switch SW1 that makes it possible to provide power to the internal circuitry of the positioner 1, then a fault status may occur wherein the power supply to the calculation processing portion 14 may be turned OFF notwithstanding the power supply to the communication processing portion 17 being in the ON state. In this case, the fault status cannot be detected by the external communicating device 11, and so there is the potential for a problem wherein the positioner 1 may be left in the fault state for an extended period of time.

This problem is explained in more detail below. If the power supply to the calculation processing portion 14 goes into the OFF state while the power supply to the communication processing portion 17 is in the ON state, then the Q output of the flip-flop 193 in the isolating circuit 19 may either go to a constant "H" level or a constant "L" level.

In this case, even though it is possible for the communicating device 11 to identify the fault state of the positioner 1 when the burnout H signal is the output signal when a fault is detected, and the Q output of the flip-flop 193 is constant at the "H" level, it is not possible for the communicating device 11 to recognize the fault state of the positioner 1 if the Q output of the flip-flop 193 is constant at the "L" level.

Conversely, even though it is possible for the communicating device 11 to identify the fault state of the positioner 1 when the burnout L signal is the output signal when a fault is detected, and the Q output of the flip-flop 193 is constant at the "L" level, it is not possible for the communicating device 11 to recognize the fault state of the positioner 1 if the Q output of the flip-flop 193 is constant at the "H" level.

In this way, if, when the power supply to the communication processing portion 17 is ON the power supply to the calculation processing portion 14 is turned OFF, the level of the Q output of the flip-flop 193 in the isolating circuit 19 cannot be defined uniquely, making it impossible to send a burnout signal reliably to the communicating device 11 in a direction that can be identified by the communicating device 11, so there is the risk of a problem in that the positioner 1 may be left in a fault state for an extended period of time.

The examples of the present invention solve problem areas such as these, and the object thereof is to provide a field device wherein it is possible to provide a fault state notification reliably to the outside when a power supply to a calculation processing portion goes OFF while a power supply to a communication processing portion is in the ON state.

SUMMARY

In order to achieve such an object, an example of the present invention is a field device having a calculation processing portion that operates by receiving a power supply that is sent through a first transmission path, a communication processing portion that operates by receiving a power supply that is sent through a second transmission path, and an isolating circuit that is provided between the calculation processing portion and the communication processing portion, wherein a burnout signal that is produced by the calculation processing portion is outputted to the second transmission path by the communication processing portion through the isolating circuit, including an inverting circuit for inverting a signal that is branch-inputted through an output line from the isolating circuit; and a selecting circuit that has a signal from the output line of the isolating circuit as a first input and the inverted signal from the inverting circuit as a second input, and that selects either the first input or the second input in accordance with a selection setting status, to output, to the communication processing portion, the selected signal, wherein the isolating circuit maintains the voltage level of the output line at a voltage level that indicates a burnout signal in a direction that is set in advance when the power supply to the calculation processing portion is in the OFF state when the power supply to the communication processing portion is in the ON state.

In examples of the present invention, when the power supply to the communication processing portion is ON and the power supply to the calculation processing portion is OFF, the voltage level of the output line of the isolating circuit is maintained at a voltage level that indicates a burnout signal in a direction that has been determined in advance. For example, if the "H" level is defined as the voltage level indicating a burnout signal in a first direction and the "L" level is a voltage level indicating a burnout signal in a second direction, then one of the voltage levels, either the "H" level or the "L" level, that has been set in advance is maintained.

Here if the voltage level of the output line of the isolating circuit is to be maintained at the "H" level, then if the selection setting state by the selecting circuit is the state wherein the first input is selected and the power supply to the communication processing portion is ON and the power supply to the calculation processing portion is OFF, then an "H" level, that is, a voltage signal indicating the burnout signal in the first direction, is reliably outputted to the communication processing portion. In contrast, if the selection setting state by the selecting circuit is the state wherein the second input is selected and the power supply to the communication processing portion is ON and the power supply to the calculation processing portion is OFF, then the signal levels of the signals inverted by the inverting circuit is held at the "L" level, and the "L" level, that is, a voltage level that indicates the burnout signal in the second direction, is outputted through the communication processing portion.

Conversely, if the voltage level of the output line of the isolating circuit is to be maintained at the "L" level, then if the selection setting state by the selecting circuit is the state wherein the first input is selected and the power supply to the communication processing portion is ON and the power supply to the calculation processing portion is OFF, then an "L" level, that is, a voltage signal indicating the burnout signal in the second direction, is reliably outputted to the communication processing portion. In contrast, if the selection setting state by the selecting circuit is the state wherein the second input is selected and the power supply to the communication processing portion is ON and the power supply to the calculation processing portion is OFF, then the signal levels of the signals inverted by the inverting circuit will be held at the "H" level, and the "H" level, that is, a voltage level that indicates the burnout signal in the first direction, is outputted through the communication processing portion.

Given the examples of the present invention, an inverting circuit for inverting a signal that is branch-inputted through an output line of an isolating circuit, and a selecting circuit for inputting, as a first input, a signal from the output line from the isolating circuit and, as a second input, the inverted signal from the inverting circuit, for selecting either the first input or the second input depending on a selection setting status, and for outputting the selected signal to the communication processing portion, are provided, so that when a power supply to a communication processing portion is ON and a power supply to a calculation processing portion is OFF, the voltage level of the output line of the isolating circuit is maintained at a voltage level that indicates a burnout signal in a direction that is established in advance, thus making it possible to ensure that the direction of the burnout signal that is outputted from the communication processing portion is in one direction when the power supply to the calculation processing portion goes into an OFF state when the power supply of the communication processing portion is in the ON state, making it possible to communicate that fault state reliably to the outside.

DETAILED DESCRIPTION

Examples of the present invention are explained below in detail, based on the drawings.

Figure 1:
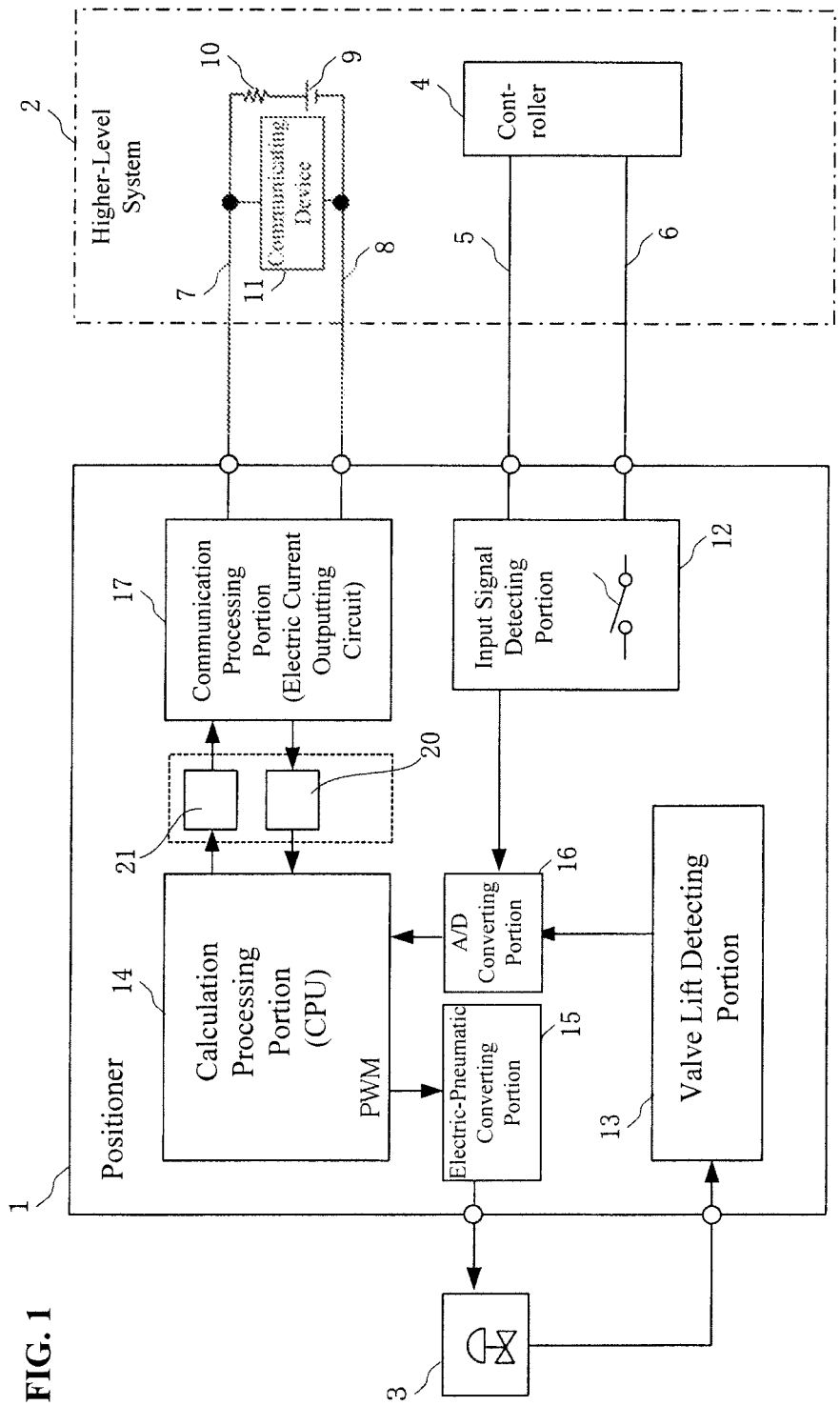
FIG. 1 is a diagram illustrating the structure of the critical components in an example of a positioner, as one example of a field device.
Figure 7:
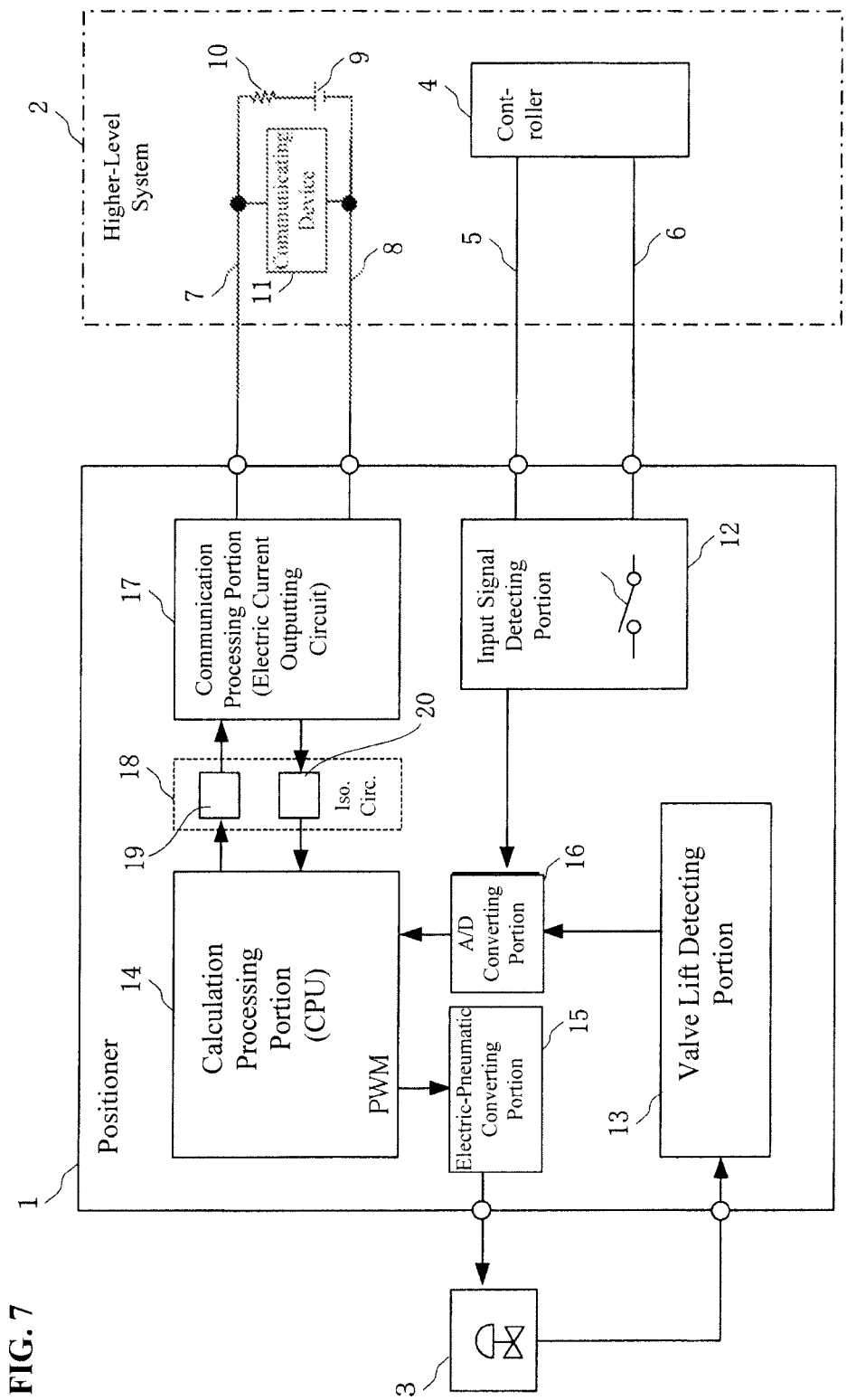
FIG. 7 is a diagram illustrating an example wherein an isolating circuit is provided between the calculation processing portion and the communication processing portion of a positioner that has a communication function.
Figure 8:
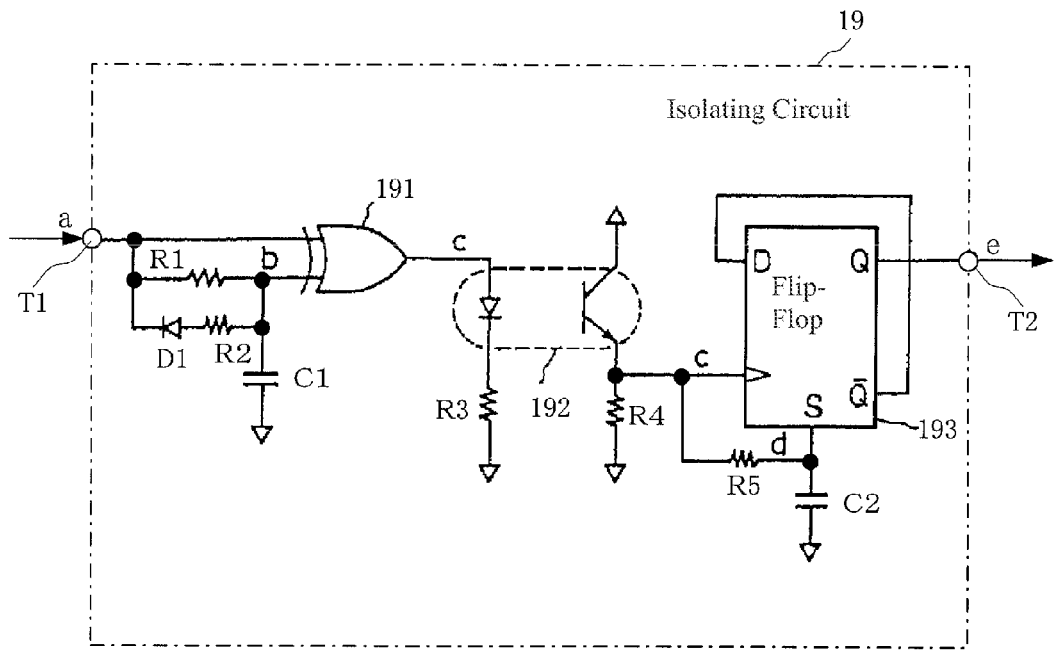
FIG. 8 is a diagram illustrating an example of the provision, as an isolating circuit, of a pulse train transmitting device, illustrated in JP '827, in the transmission path from the calculation processing portion to the communication processing portion.
Figure 9:
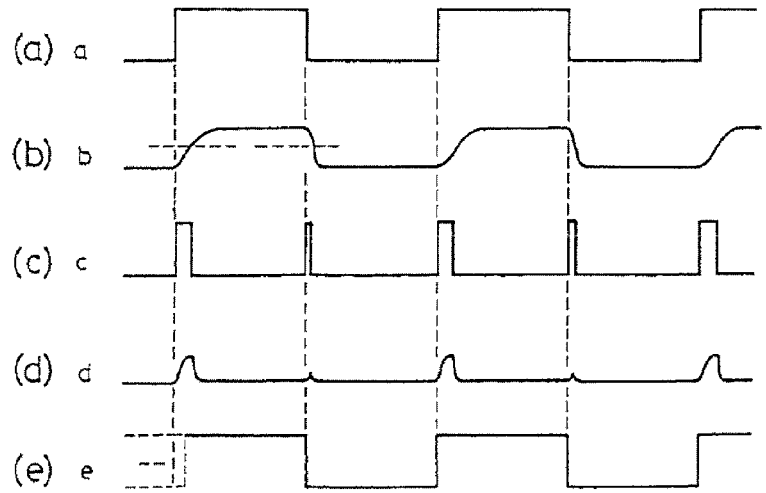
FIG. 9 is a timing chart illustrating the operation of an isolating circuit.

FIG. 1 shows a structural diagram of the critical components illustrating an example of a positioner, as an example of a field device, according to the present invention. In this figure, codes that are the same as those in FIG. 7 indicate identical or equivalent structural elements as the structural elements explained in reference to FIG. 7, and explanations thereof are omitted.

Figure 2:
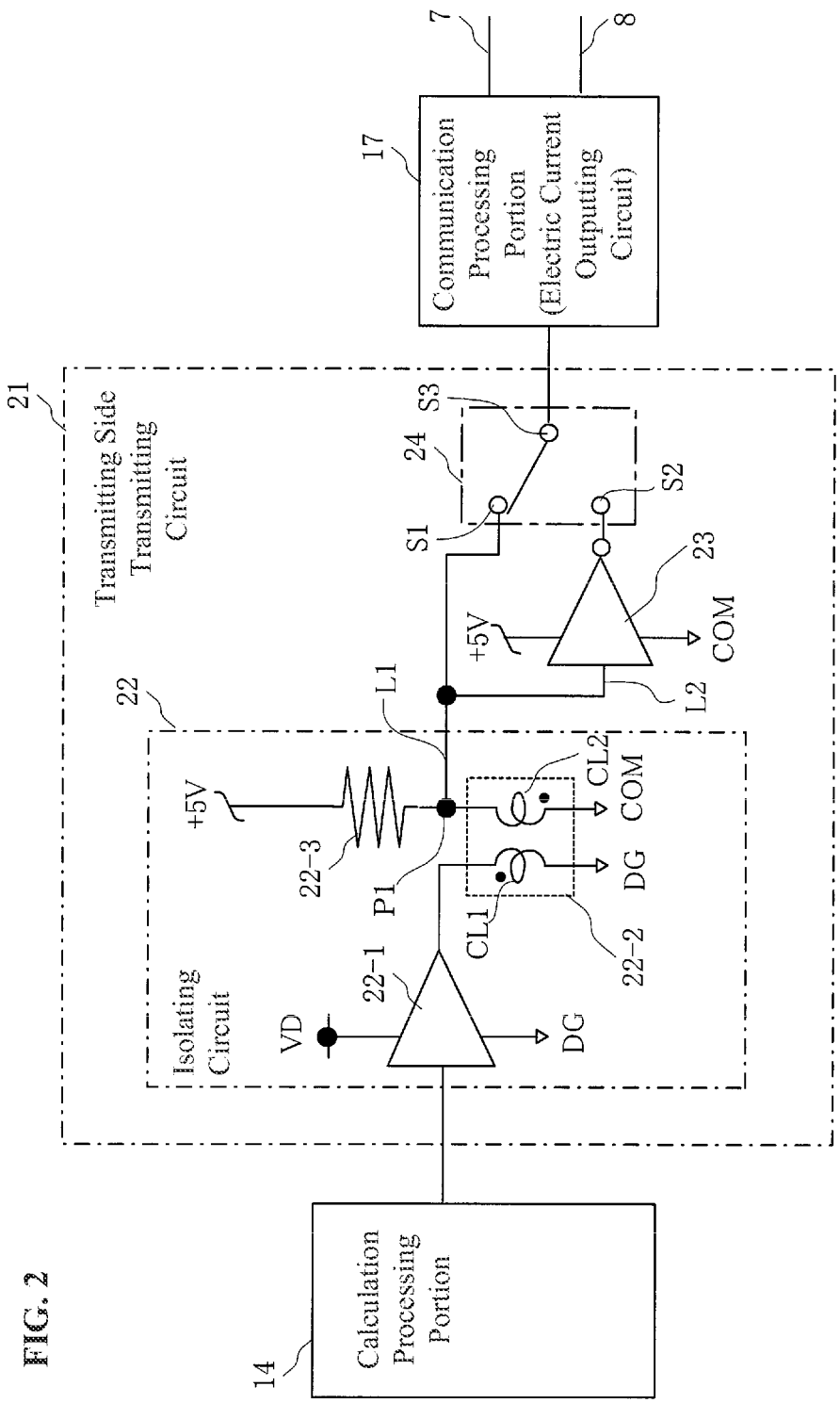
FIG. 2 is a diagram illustrating the structure of a transmitting side transmitting circuit provided in the transmission path to the communication processing portion from the calculation processing portion of positioner.

In the present example, a transmitting side transmission circuit 21 is provided as a circuit in the transmission path to the communication processing portion 17 from the calculation processing portion 14. FIG. 2 shows the circuit structure of the transmitting side transmitting circuit 21.

This transmitting side transmitting circuit 21 is structured from an isolating circuit 22 and inverting circuit 23 for inverting a signal that is branched and inputted through an output line L1 of the isolating circuit 22 and a selecting circuit 24, which uses the signal from the output line L1 of the isolating circuit 22 as a first input and uses the inverted signal from the inverting circuit 23 as a second input and selects either the first input or the second input, depending on the selection setting status, to output the selected signal to the communication processing portion 17.

The isolating circuit 22 is structured from an op amp 22-1 that inputs a signal from the calculation processing portion 14, an isolation transformer 22-2, and a resistor 22-3. In the isolating circuit 22, the output current from the op amp 22-1 flows in the coil CL1 on the primary side of the isolation transformer 22-2, to produce, at the connecting point P1 between the coil CL2 on the secondary side of the isolation transformer 22-2 and the resistor R22-3, a voltage induced by the output current. Note that a +5 V voltage is applied to the other end of the resistance R22-3. This +5 V voltage is produced through the power supply supplied from the second double-wire transmission path 7 and 8. Moreover, a voltage VD is applied to the op amp 22-1 as the operating power supply thereof, where this voltage VD is produced through the supply power supply from the first double-wire transmission path 5 and 6.

The inverting circuit 23 is connected between the branch line L2, which branches from the output line the L1 of the isolating circuit 22, and the second input terminal S2 of the selecting circuit 24, to invert the signal from the branch line L2 and output it to the second input terminal S2 of the selecting circuit 24. A +5 V voltage is applied as the operating power supply to the inverting circuit 23. This +5 V voltage is produced through the power supply supplied from the second double-wire transmission path 7 and 8.

The selecting circuit 24 is provided with a first input terminal S1, a second input terminal S2, and an output terminal S3, where the signal from the output line L1 of the isolating circuit 22 is inputted into the first input terminal S1, and the signal from the inverting circuit 23 is inputted into the second input terminal S2. The selecting circuit 24 is a manually operated switch, and when placed in the first selection setting state it connects the first input terminal S1 to the output terminal S3, and when placed in the second selection setting state it connects the second input terminal S2 to the output terminal S3, The output signal from the output terminal S3 is sent to the communication processing portion 17.

If the output signal is a burnout H signal when there is a fault, that is, if the communicating device 11 is a device that identifies a fault when the signal is a level that is higher than the upper limit value of the normal electric current range, then the selection setting state of the selecting circuit 24 in the transmitting side transmitting circuit 21 is set to the first selection setting state. That is, the selecting circuit 24 is operated manually to set to a state wherein the first input terminal S1 and the output terminal S3 are connected together (the state wherein the first input is selected).

Doing so causes the voltage level of the output line L1 of the isolating circuit 22 to maintain the "H" level when the power supply to the calculation processing portion 14 goes into the OFF state (VD=0V) in the state wherein the power supply to the communication processing portion 17 is in the ON state (the state wherein the application of the +5 V voltage is continued) due to, for example, the operator forgetting to turn OFF the switch SW1 that enables the power supply to the internal circuitry of the positioner 1, where this "H" level passes through the selecting circuit 24 that is in the first selection setting state, to output reliably the "H" level, that is, a voltage indicating the burnout H signal, to the communication processing portion 17.

If the output signal is the burnout L signal when there is a fault, that is, if the communicating device 11 is a device that identifies a fault when the signal is a level that is lower than the lower limit value of the normal electric current range, then the selection setting state of the selecting circuit 24 in the transmitting side transmitting circuit 21 is set to the second selection setting state. That is, the selecting circuit 24 is operated manually to set to a state wherein the second input terminal S2 and the output terminal S3 are connected together (the state wherein the second input is selected).

Doing so causes the voltage level of the output line L1 of the isolating circuit 22 to maintain the "H" level, and the voltage level of the signal that is inverted by the inverting circuit 23 to be maintained at the "L" level, when the power supply to the calculation processing portion 14 goes into the OFF state (VD=0V) in the state wherein the power supply to the communication processing portion 17 is in the ON state (the state wherein the application of the +5 V voltage is continued) due to, for example, the operator forgetting to turn ON the switch SW1 that enables the power supply to the internal circuitry of the positioner 1, where this "L" level passes through the selecting circuit 24 that is in the second selection setting state, to output reliably the "L" level, that is, a voltage indicating the burnout L signal, to the communication processing portion 17.

In this way, in the present example, when the power supply to the calculation processing portion 14 goes into the OFF state when the power supply to the communication processing portion 17 is in the ON state, one of the directions of the burnout signal that is outputted from the communication processing portion 17 is secured, making it possible to provide notification of the fault state reliably to the communicating device 11 on the outside.

Note that while the voltage level of the output line L1 from the isolating circuit 22 is maintained at the "H" level when the power supply to the calculation processing portion 14 went into the OFF state when the power supply to the communication processing portion 17 was in the ON state, conversely the "L" level may be maintained instead.

In the case wherein the voltage level of the output line L1 of the isolating circuit 22 is to be maintained at the "L" level, when the selection setting state of the selecting circuit 24 is set to the first selection setting state (the state wherein the first input is selected), the "L" level, that is, the voltage level that indicates the burnout L signal, will be outputted reliably to the communication processing portion 17 in the event that the power supply to the calculation processing portion 14 is turned to the OFF state while the power supply to the communication processing portion 17 is in the ON state.

In contrast, when the selection setting state of the selecting circuit 24 is set to the second selection setting state (the state wherein the second input is selected), the voltage level of the signal inverted by the inverting circuit 23 is maintained at the "H" level, and the "H" level, that is, the voltage level that indicates the burnout H signal, is outputted reliably to the communication processing portion 17 in the event that the power supply to the calculation processing portion 14 is turned to the OFF state while the power supply to the communication processing portion 17 is in the ON state.

Figure 3:
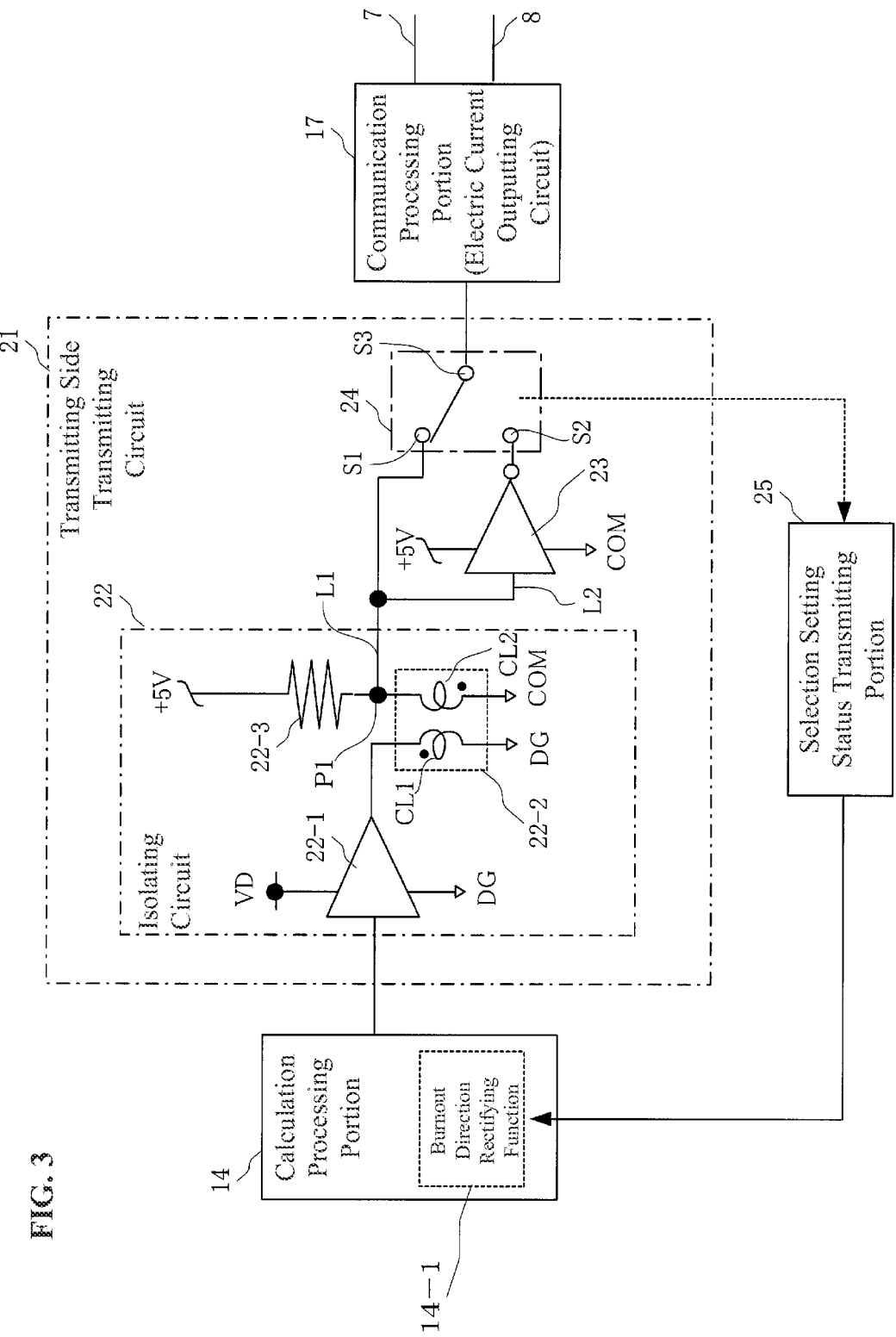
FIG. 3 is a diagram illustrating the provision of selection setting status transmitting portion for transferring the selection setting status in the selecting circuit to the calculation processing portion.

FIG. 3 illustrates an example of the direction of the burnout signal that is produced by the calculation processing portion 14, and an example of further rectification of the direction of the burnout signal that is outputted through the selecting circuit 24 in the event of the power supply to the calculation processing portion 14 being turned OFF when the power supply to the communication processing portion 17 is ON.

In this example, selection setting status transmitting portion 25 are provided in relation to the transmitting side transmitting circuit 21, where the selection setting state of the selecting circuit 24 is sent to the calculation processing portion 14. In this case, the calculation processing portion 14 rectifies, to the same direction as the burnout signal that is outputted from the selecting circuit 24, the direction of the burnout signal it produces itself in the event that there is a difference in the direction of the burnout signal outputted by the selecting circuit 24 to the communication processing portion 17 in the event of the power supply to the calculation processing portion 14 being turned OFF while the power supply to the communication processing portion 17 is ON, based on the selection setting state in the selecting circuit 24 that is transmitted by the selection setting status transmitting portion 25, through the burnout direction rectifying function 14-1.

Note that the selection setting status transmitting means 25 may be an interlock switch that interlocks with the switch operation of the selecting circuit 24 to transmit to the calculation processing portion 14 the selection setting status of the selecting circuit 24, or may be an independent switch that provides notification of the selection setting status of the selecting circuit 24 through a manual operation in conjunction with the switch operation of the selecting circuit 24. Moreover, it may be a functional block wherein the selection setting status of the selecting circuit 24 is detected automatically and the detection result is sent to the calculation processing portion 14 through an isolating circuit that is provided separately from the isolating circuit 22.

Figure 4:
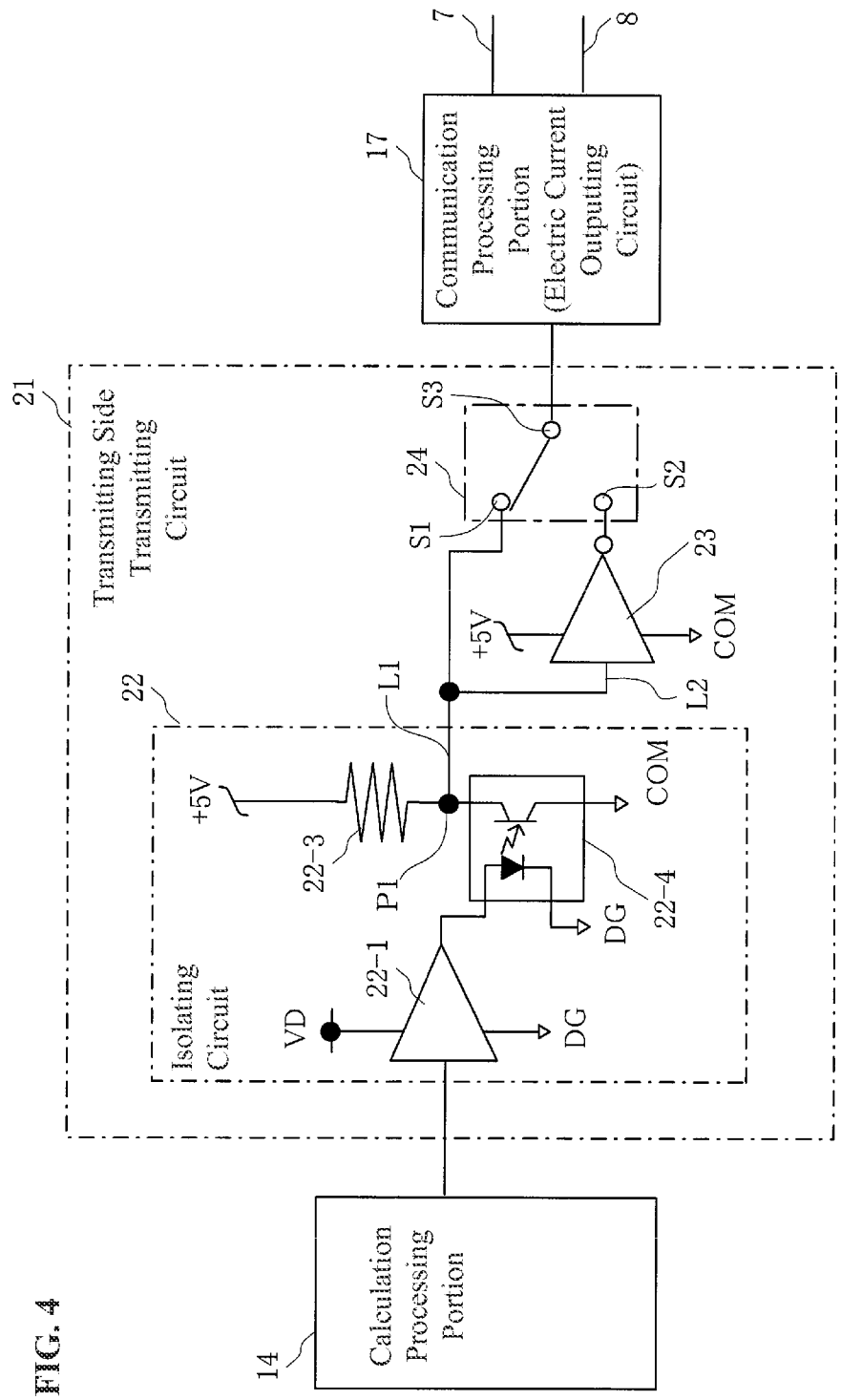
FIG. 4 is a diagram illustrating an example wherein a photocoupler is used instead of an isolation transformer.
Figure 5:
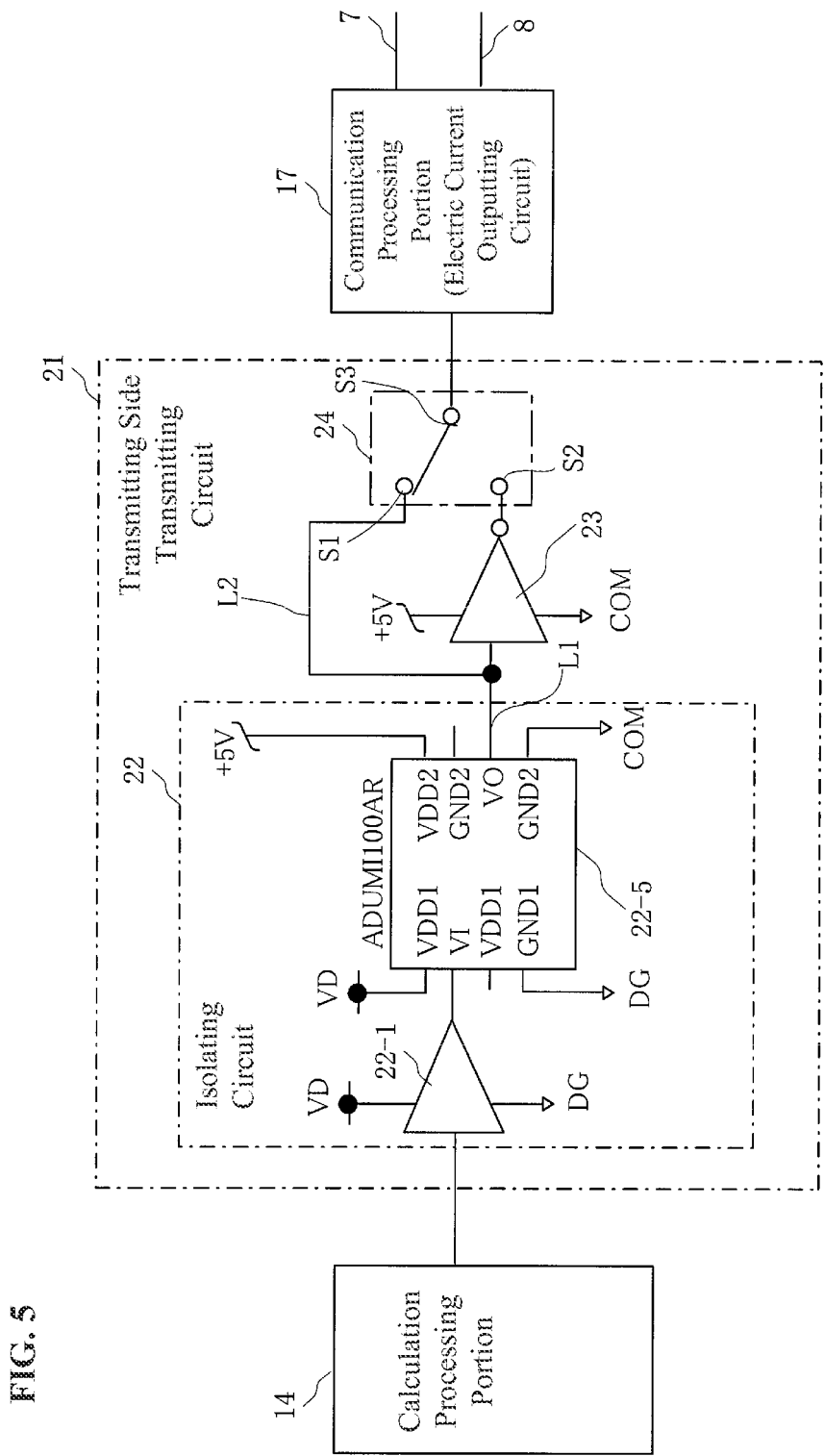
FIG. 5 is a diagram illustrating an example wherein an isolator IC is used instead of an isolation transformer.
Figure 6:
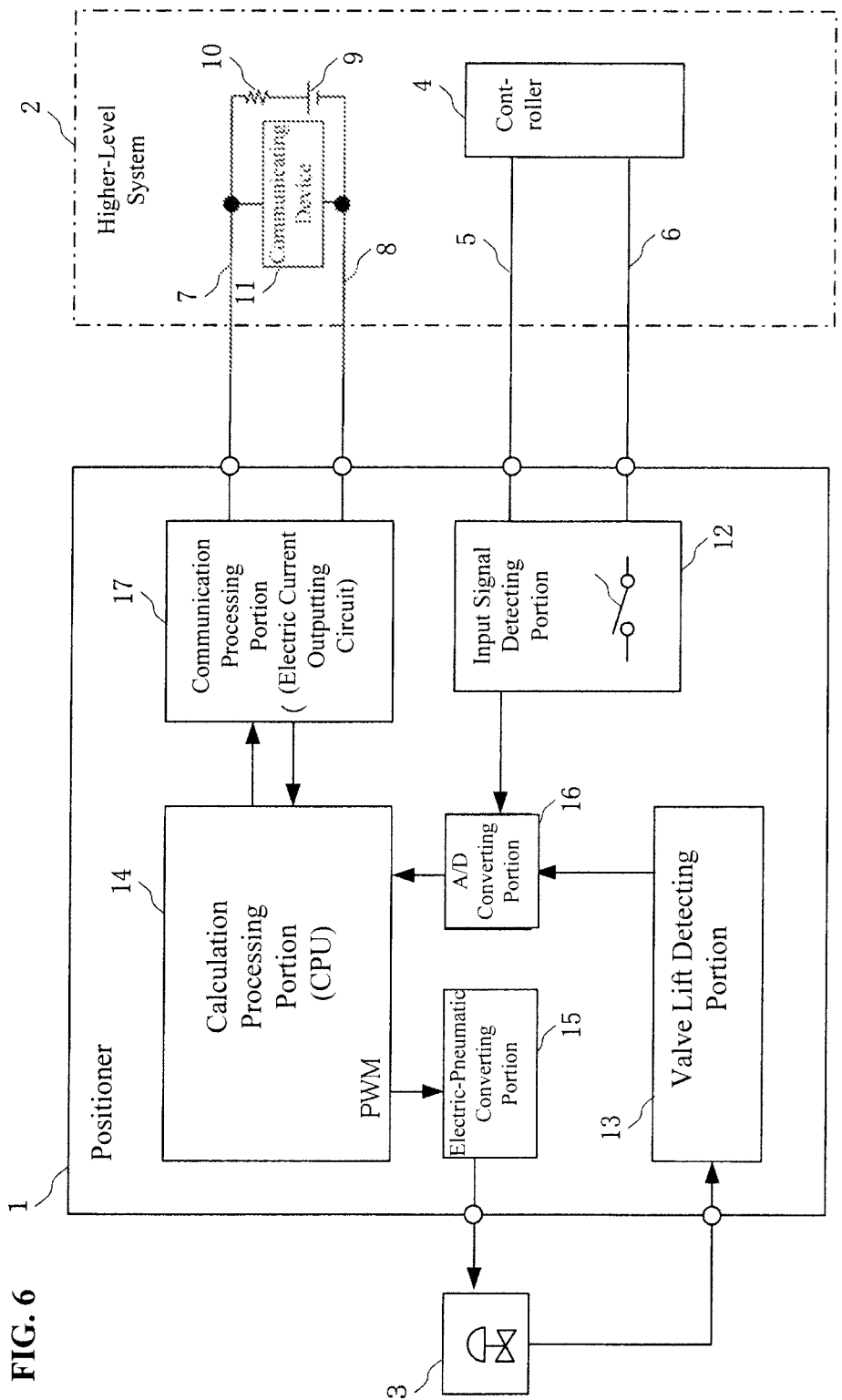
FIG. 6 is a diagram showing a structural diagram of the critical components in a positioner that has a conventional communication function.

Moreover, while in the example set forth above an isolation transformer 22-1 was used as the primary structural element in the isolating circuit 22, a photocoupler 22-4 may be used instead, as illustrated in FIG. 4. Moreover, an isolator IC 22-5 may be used, as illustrated in FIG. 5, or the like.

Examples of the field device according to the present invention can be used in a variety of fields, such as process control, as, for example, a positioner for controlling the opening of a regulator valve.

The invention claimed is:

1. A field device comprising:
   a calculation processing portion that operates by receiving a power supply that is sent through a first transmission path;
   a communication processing portion that operates by receiving a power supply that is sent through a second transmission path;
   an isolating circuit that is provided between the calculation processing portion and the communication processing portion, wherein a burnout signal that is produced by the calculation processing portion is outputted to the second transmission path by the communication processing portion through the isolating circuit;
   an inverting circuit that inverts a signal that is branch-inputted through an output line from the isolating circuit;
   a selecting circuit that receives a signal from the output line of the isolating circuit as a first input and the inverted signal from the inverting circuit as a second input, and that selects either the first input or the second input in accordance with a selection setting status, to output, to the communication processing portion, the selected signal; and
   a selection setting status transmitter that transmits the selection setting status in the selecting circuit to the calculation processing portion, wherein:
   the isolating circuit maintains a voltage level of the output line at a predetermined voltage level that indicates a predefined burnout signal when the power supply to the calculation processing portion is turned OFF when the power supply to the communication processing portion is tuned ON; and
   the calculation processing portion further comprises:
      a rectifier that rectifies, based on the selection setting status transmitted to the calculation processing portion by the selection setting status transmitter, the burnout signal produced by the calculation processing portion to the burnout signal which the selecting circuit outputs to the communication processing portion when the power supply to the calculation processing portion is turned OFF, when the power supply to the communication processing portion is turned ON, and when the burnout signal produced by the calculation processing portion is different from the burnout signal which the selecting circuit outputs to the communication processing portion.

* * * * *